May 28, 1946.  F. J. FIELITZ  2,401,236
APPARATUS FOR PRODUCING SUBDIVIDED MOLDING MATERIAL
Filed Oct. 10, 1942
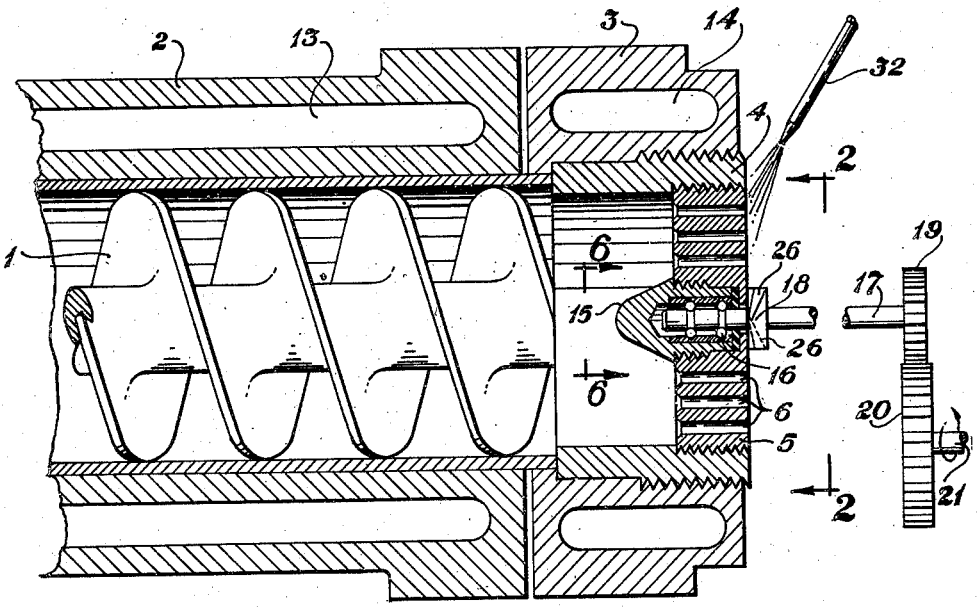
Fig. 1
Fig. 3
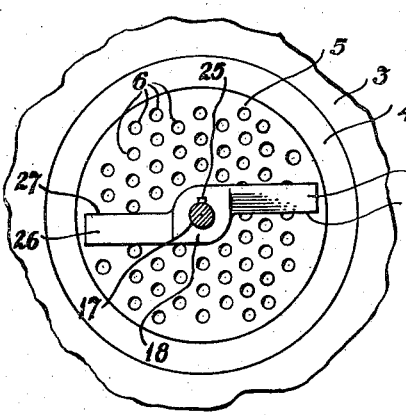
Fig. 2
Fig. 4
Fig. 5
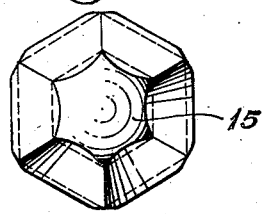
Fig. 6
Frederick J. Fielitz  INVENTOR.
BY  J. M. Castle
ATTORNEY Patented May 28, 1946

2,401,236

UNITED STATES PATENT OFFICE 2,401,236

APPARATUS FOR PRODUCING SUBDIVIDED MOLDING MATERIAL

Frederick J. Fielitz, Belleville, N. J., assignor to E. I. du Pont de Nemours & Company, Wilmington, Del., a corporation of Delaware Application October 10, 1942, Serial No. 461,512

4 Claims. (Cl. 18—12)

This invention relates to an apparatus for producing subdivided molding material and, more particularly, to an apparatus for forming pellets from continuously extruded strands of an organic thermoplastic molding material.

A molding compound must have certain physical characteristics to be suitable for molding, especially for injection molding. It should consist of discrete particles of uniform size, free from dust and fines, and should have a uniform bulk density. Because the strength and toughness of the molded article is in part dependent upon the size of the material fed into the molding machine, the particle size should be carefully selected for the particular use involved.

To meet these requirements satisfactorily, attempts have been made to produce injection molding material in the form of pellets, rather than of powder or granules. Some of the proposed methods have resulted in products which were not suited for the purpose while others have proved to be too expensive for practical use.

An object of the present invention is to form substantially uniform pellets of an organic thermoplastic molding material. A further object of the invention is to provide an economical method and apparatus for producing molding material of uniform particle size and bulk density particularly suitable for use in injection molding machines. Other objects will be apparent from the description of the invention given hereinafter.

The above objects are accomplished according to the present invention by continuously extruding an organic thermoplastic molding material at a temperature at which the material is plastic, through a perforated die plate evenly over the entire perforated area thereof to form a plurality of strands of plastic and cutting these strands into pieces of equal length as they emerge from the die plate.

The invention further comprises an apparatus for carrying out the above process. This apparatus, in its important features, comprises a screw stuffer having a perforated die plate, special means whereby plastic may be extruded through the die plate evenly over the entire perforated area thereof, a rotatable knife mounted in axial alignment with the center of the die plate and adjacent the external face thereof, and means for driving the rotatable knife controlled independently of the means for driving the screw of the screw stuffer. A specific feature of the apparatus resides in the angle of the blades of the rotatable knife with respect to the exterior surface of the die plate as will be explained in more detail hereinafter.

For a more detailed description of the invention, reference is made to the accompanying drawing, in which:

Fig. 1 is a longitudinal view, partly in section, of part of an apparatus for extruding and cutting plastic strands according to the present invention;

Fig. 2 is an elevation of a part of the apparatus shown in Fig. 1 and looking in the direction of the arrows 2—2 of Fig. 1;

Fig. 3 is an enlarged section of a portion of the die plate and a blade of the rotatable knife shown in Fig. 2, taken in a plane perpendicular to the radius of rotation median to the section and showing the relationship of the blade to the die plate;

Fig. 4 shows a rotatable knife, the blades of which have a hollow-ground face;

Fig. 5 illustrates a modified type of rotatable knife; and

Fig. 6 is a view of the axial pressure distributor looking in the direction of the arrows 6—6 of Fig. 1.

Referring more particularly to Figs. 1 and 2, the apparatus comprises a screw stuffer which in general design is of the type commonly used in the plastics industry and so only the modified portion thereof has been illustrated. The feed screw 1 is housed within the cylinder 2 carrying the head 3 in which is removably mounted a bushing 4. The bushing 4 carries the die plate 5 having a multiplicity of perforations 6. Chambers 13 and 14 in the cylinder 2 and head 3, respectively, are provided for heating or cooling fluids.

Removably mounted on the internal face of the die plate 5 is the pressure distributor 15 which also serves as the housing for the bearing 16 in which one end of the spindle 17 is journaled. Upon this spindle 17 is mounted the rotatable knife 18 adjacent the external face of the die plate 5. The spindle 17 carries the gear wheel 19 at its opposite end and this gear wheel 19 is driven by a second gear wheel 20 mounted on shaft 21. Shaft 21 may be actuated by any convenient means such as an electric motor which can be controlled entirely independently of the means driving the screw 1. The screw 1, pressure distributor 16, spindle 17, and rotatable knife 18 mounted thereon, are all in axial alignment with the center of the die plate 5.

The feed screw 1 operates to force plastic material through the perforations 6 in the die plate 5. When a die plate is used having uniform perforations and a planar inner surface closely adjacent to the screw, extrusion is most rapid near the periphery, grading to a lower rate in the region of the innermost perforations. This effect is most pronounced with die plates having perforations directly in front of the hub of the feed screw.

It will be noted, see Fig. 1, that the screw 1 terminates well back from the die plate 5 and that the modified pineapple-shaped pressure distributor 16 is provided on die plate 5. It has been found that this arrangement results in a substantially uniform rate of extrusion over the entire perforated area of the die plate 5 and this is essential in the apparatus herein considered in order that all the strands of plastic as extruded may be cut into pieces of substantially equal length. As shown in Fig. 6, the pressure distributor 16 is actually hexagonal in shape but this is not essential and merely facilitates its removal from the die plate 5 with a wrench.

Terminating the screw 1 an appreciable distance from the die plate 5 serves also to reduce impulse effect, manifested by the occurrence of fastest extrusion in a narrow region which moves around the die plate with the rotation of the screw. Further dampening of impulse is obtained by the use of a screw 1 of which at least the extrusion end is provided with a multiple thread as shown in Fig. 1.

Nevertheless, differences in composition and in operating conditions will result in different extrusion speeds. Even when an apparently uniform plastic material is fed into the apparatus, considerable variation in the rate of extrusion may occur during a single run. Apparatus in which the speed of the cutter depends upon the speed of the feed screw cannot compensate for such fluctuations.

In order that the size of the pellets may be regulated at will, and especially, that pellets of equal length may be obtained regardless of the rate of extrusion, the present invention provides for actuating the rotatable knife 18 by an easily controlled means, such as an electric motor, entirely independently of the feed screw 1. The speed of the rotatable knife 18 is manually adjusted to yield the desired particle size for a given rate of extrusion. Increases and decreases in extrusion rate are compensated for by faster and slower speeds of the rotatable knife. For use with apparatus in which the rate of extrusion may vary from about 30 to about 65 inches per minute, speeds progressively variable between about 60 and 500 revolutions per minute for a two-bladed knife are desirably provided.

As shown clearly in Fig. 2, the rotatable knife 18 is fixed on the spindle 17, as by a key 25 or equivalent means, and comprises two blades 26, the cutting edges 27 of which coincide with a diametrical line through the axial center of spindle 17 and lie in a plane parallel to the external face of die plate 5. A slight clearance is preferably provided between the cutting edges 27 and die plate 5. The rotatable knife shown in Figs. 1 and 2, as well as that in Figs. 4 and 5, is designed to rotate in a clockwise direction although it may be designed for counter-clockwise rotation. The inner faces of the blades 26 of the rotatable knife 18 are not parallel to the die plate 5 but are positioned at an angle B; this can be seen in Fig. 1 but is more clearly illustrated in enlarged Fig. 3.

It has been found that optimum overall cutting performance is obtained by a rotatable knife, the inner surface of which is positioned at an angle B to the plane of the die plate, which angle is so selected that with a practical maximum rate of extrusion and a practical minimum rate of rotation of the knife for the particular apparatus involved none of the extruded strands of plastic exert pressure against the said inner surface and the ends of at least some of the strands make touching contact with the inner surface of the blade adjacent to the edge opposite the cutting edge as that region passes thereover. This means that the maximum practical extrusion distance during the time interval required for the blade to pass over any point on the plate while the knife is rotating at an estimated practical minimum speed, is just equal to the distance between the cutting edge and that part of the blade farthest from the die plate, measured along a perpendicular to the die plate. In practice the value of B may be obtained from the formula—

$$\tan B = \frac{q \sin^{-1}\left(\frac{b}{2r}\right)}{180 b n}$$

where $n$ is the minimum practical rate of rotation in revolutions per minute, $r$ is the distance in inches from the center to a point on the die plate, $q$ is the linear rate of extrusion in inches per minute at said point, and $b$ is the width in inches along a line parallel to the die plate of a section of the blade taken in a plane passing through said point and tangent to the radius of rotation median to the section, the point being so chosen that B has a value equal to or greater than that which could be obtained by selecting any other point.

When the angle B has a value less than that determined by the method just outlined, extruded material will, at least sometimes, bear against the inner face of the knife, forcing it away from the die plate, thereby altering the length of the pellet and the sharpness of the cut. Such pressure is never entirely uniform but invariably fluctuates so as to alternately bend and release the blade, yielding non-uniform pellets. Where the angle B is considerably less than optimum, the force exerted by the extruded material may be sufficient to break the knife.

When B has a value greater than optimum, the angle of the outer face must be correspondingly increased. In a knife of the type illustrated in Figs. 1, 2 and 3, in which the inner and outer faces meet along a single straight line to form a dihedral angle, the angular position of the outer face will be greater than that of the inner face by an amount determined by the requirements of strength as related to the material of which the blade is constructed. Since improvement in cutting properties is noted as the tilt of the outer face of the blade is reduced, approaching parallelism with the die plate, an increase in B over that required to maintain the inner face of the blade in touching contact with the ends of the extruded strands as the blade passes thereover results in an unnecessary reduction in cutting performance. The angle of tilt will ordinarily be between about two degrees and about fifteen degrees.

It will be apparent that, since the lineal velocity of a point on a blade for a given angular velocity increases with the distance from the axis of rotation, the value of B will be greatest for points nearest the center under the condition of uniform extrusion over the entire perforated area. The blade may be so constructed that the tilt of the inner face decreases regularly along the blade from the calculated optimum at the center, the degree of tilt at any point being such as will permit, in normal operation of the apparatus, touching contact of the extruded strands with the inner face at both the cutting edge and the opposite edge successively without appreciable outward pressure. The tilt of the outer face of the blade desirably corresponds, so that the thickness of the blade is substantially constant throughout its length.

Particularly efficient for cutting tacky material is a blade, such as shown in Fig. 4, having a hollow ground outer face 30 which serves to propel the cut particle rapidly forward away from the plane of cutting. This type of knife provides a combination of strength, keenness of cutting and forward thrust which cannot be equaled by a knife having planar faces.

The rotatable knives illustrated in Figs. 2 and 4 cut by shearing. In Fig. 5 there is shown a rotary knife in which the parallel cutting edges 31 are disposed along lines which do not pass through the axis of rotation. Such a knife acts to both shear and slice, the movement of each point on the blade being oblique to the edges. It has been discovered that a particularly clean cut is obtained by a knife of this design, especially where the cross-section is similar to that of Fig. 4.

While the knives shown in the drawing have two blades, more than two may be provided if desired. For a given rate of extrusion, however, cleanness of cutting with a given type of blade varies with the speed of the blade, so that a double-bladed knife rotating twice as fast as a four-bladed knife yields a more satisfactory product. Single blades may be used with yet better cutting action, although the unbalanced condition inherent therein decreases the life of the machine.

While it is preferred to use knives as illustrated in the drawing, it is feasible to cut the strands of plastic as they emerge from the perforated die plate, by other types of cutters as, for example, a single straight wire positioned diametrically in front of the die plate and supported and held taut by an annular disc or hoop which is suitably supported and actuated by a means of rotation independent of the rotation of the screw. Alternatively, more than one wire cutter may be used.

It has been discovered that the removal of pellets of tacky material from the knife blade in the apparatus of the present invention is facilitated by the use of a stream of air, or other gas, directed at the center of the die plate. The stream may conveniently issue from a nozzle 32 placed slightly to one side of the front of the apparatus (see Fig. 1). Where the issuing material is both hot and tacky, the stream of air has the additional effect of hardening the pellets sufficiency to prevent agglomeration, hardening being due in part to the removal of a portion of the solvent and in part to surface cooling.

The following examples in which all parts are given by weight unless otherwise stated, illustrate the more detailed practice of the present invention:

Example I

There is employed an apparatus, of the type illustrated in Fig. 1, having a die plate 6¼ inches in diameter and 1½ inches thick bearing 214 cylindrical perforations, each $\frac{3}{32}$ inch in diameter, uniformly distributed to a peripheral zone having a 2$\frac{1}{16}$ inch radial width.

The independently driven knife has a configuration shown in Fig. 2, the width of the blade being 1 inch. The tilt of the blade (angle B) is 13°. The temperature of the cylinder chamber is maintained at 70° F. The head is maintained at 200° F.

The following ingredients are compounded in a separate mixer to form a semi-colloided mass:

| | Parts |
|---|---|
| Cellulose acetate (acetic No. 57.5) | 100 |
| Dimethyl phthalate | 10 |
| Diethyl phthalate | 30 |
| Methyl acetate | 49.5 |
| Ethyl alcohol (denatured) | 10 |
| Stearic acid | 0.75 |

The semi-colloid is fed continuously into the extrusion apparatus. The rate of extrusion, which is substantially uniform over the entire perforated region of the die plate, varies somewhat for several minutes, but finally becomes fairly constant at 50 inches per minute. The two-bladed knife is operated at a speed of 134 R. P. M. Removal of the pellets from the cutter is facilitated by a stream of air directed at the center of the die plate partly countercurrent to the direction of extrusion. The pellets exhibit little or no tendency to adhere to the machine or to one another. They are uniform and have the shape of approximate right cylinders about $\frac{3}{32}$ inch in diameter and $\frac{1}{16}$ inch long. The product is then seasoned, after which it is found ideally suited for use in injection molding machines.

Example II

The material used in Example I is replaced by a composition consisting:

| | Parts |
|---|---|
| Cellulose acetate (acetic No. 56.5) | 100 |
| Dimethyl phthalate | 40 |
| Acetone | 36 |
| Ethyl alcohol (denatured) | 20 |

Extrusion occurs at a rate of 37 inches per minute with cylinder and head chamber temperatures of 65° and 175° F., respectively. The two-bladed knife is operated at 74 R. P. M. Uniform cylindrical pellets $\frac{3}{32}$ inch in diameter and ¼ inch long are obtained.

Example III

A homogeneous, crumbly mass is formed by mixing the following ingredients together:

| | Parts |
|---|---|
| Cellulose acetate (acetic No. 54.5) | 100 |
| Dimethyl phthalate | 31.5 |
| Diethyl phthalate | 13.5 |
| Ethyl alcohol (denatured) | 42 |
| Water | 14 |

The material is fed into an apparatus identical to that described in Example I, except that the cutter has the configuration illustrated in Fig. 4, the angle of tilt (angle B) being 10°, with jacket and head chamber temperatures of 50° and 180° F., respectively. The cutter speed is 57 R. P. M. Individual pellets measure ⅜ inch in length and have a diameter of approximately 3/32 inch.

Example IV

Material having the following composition is extruded under the conditions and with the results described in Example I:

| | Parts |
|---|---|
| Cellulose acetate (acetic No. 54.5) | 100 |
| Diphenyl phthalate | 35.2 |
| Camphor | 8.8 |
| Triphenyl phosphate | 16.5 |
| Mixture of ortho and paratoluene sulfonamides | 2.2 |
| Ethyl alcohol (denatured) | 40 |
| Water | 14 |

It will be understood that both the foregoing examples and the particular form of apparatus shown in the drawing are merely illustrative and that the invention is not limited to either. In its broad phase, the invention comprises the method of forming pellets of molding material by continuously extruding the molding material at a temperature at which the material is plastic, through a perforated die plate evenly over its entire perforated area to form a plurality of strands of plastic and cutting these strands into short pieces of equal length as they emerge from the die plate.

The present invention is applicable to many different kinds of plastic materials but it has been particularly designed for, and is especially advantageous when used in conjunction with organic thermoplastic molding material. The primary ingredient of such molding material will ordinarily be a cellulose derivative or a synthetic or natural resin. Cellulose derivatives which may be advantageously used in this invention include cellulose nitrate, cellulose esters of organic acids, cellulose mixed esters, and cellulose ethers. Among the synthetic resins which may be used are polymerized acrylic and alpha-substituted acrylic acid derivatives such as methyl methacrylate, polyvinyl alcohol and derivatives thereof, polymerized aliphatic hydrocarbons, polystyrene, and even urea-formaldehyde and phenol-formaldehyde resins which are generally not regarded as true thermoplastic materials. The aforementioned plastics may be used in mixtures with one another and with other plastic materials. Plasticizers, solvents, coloring agents, catalysts, fillers, and other modifiers may form a part of the composition.

The merits of the apparatus are most apparent when there is used therewith a plastic composition formed by mixing together at room temperature the various ingredients including a cellulose derivative, such as cellulose acetate, and such proportions of plasticizer and solvent that the mixture is a homogeneous colloid at elevated temperatures, but only semi-colloided and nonself adhesive at room temperature. With the more easily organo-soluble cellulose acetates, a single inactive solvent, which swells but does not completely dissolve the cellulose acetate, may be effective. In other cases a mixture of an active and an inactive solvent, or non-solvent, may be required.

The apparatus may be modified widely without departing from the spirit of this invention. Any screw stuffer adapted for the extrusion of plastics may be used. The shape of the axial pressure distributor may be varied and the pressure distributor may even be eliminated if care is taken to minimize unevenness in the rate of extrusion; the use of both the pressure distributor and a feed screw terminating an appreciable distance, normally at least 3.5 inches, short of the die plate is, however, greatly preferred for reasons heretofore set forth.

Although the means for driving the feed screw of the stuffer have not been shown in the drawing as it is contemplated conventional means would be used and the specific means for driving the rotatable knife forms no part of the present invention, the combination of separately controlled means for driving the feed screw and the rotatable knife does form an important part of this invention. It has been found that only through the use of independently controlled means for driving these two elements can plastic pellets of uniform size be obtained because the extrusion rate of the plastic through the die plate cannot be made sufficiently uniform to employ a knife driven at a fixed relative speed to that of the feed screw.

Material formed by the method of this invention is not confined to use in injection molding, but may be used with equal facility and advantage in transfer and compression molding. For instance, the high degree of uniformity of particle size makes possible the delicate control of mottle effects obtained by compression molding.

The invention described herein provides for the uniform extrusion of plastic material over the entire perforated area of the die plate and for the simultaneous severing of the extruded strands into pellets of uniform size. Pellets may thus be formed from normally tacky material which retain their individual identity and intended form without agglomeration. The invention makes possible the regulation of particle size without regard to the rate of extrusion. By use of the method and apparatus herein described there may be produced at low cost uniform pelleted material of non-varying bulk density suitable for injection molding machines. The use of this material makes possible the highest degree of efficiency in injection molding.

As many apparently widely different embodiments of this invention may be made without departing from the spirit and scope thereof, it is to be understood that the invention is not limited to the specific embodiments thereof except as defined in the appended claims.

I claim:

1. An apparatus for forming uniformly sized pellets of an organic thermoplastic molding material, said apparatus comprising a screw stuffer, a perforated die plate at the extrusion end thereof, the extrusion end of the feed screw of said screw stuffer being spaced an appreciable distance from said die plate, an axial pressure distributor mounted on the internal face of said die plate, a rotatable cutter mounted in axial alignment with the center of said die plate and adjacent the external face thereof, means for driving said feed screw, and means for driving said rotatable cutter controlled independently of the means for driving said feed screw.

2. An apparatus for forming uniformly sized pellets of an organic thermoplastic molding material, said apparatus comprising a screw stuffer, a perforated die plate at the extrusion end thereof, a rotatable knife mounted in axial alignment with the center of said die plate and adjacent the external face thereof, the inner face of each blade of said knife being a plane surface and disposed at an angle of two degrees to fifteen degrees to the external surface of said die plate, said angle being such that, under conditions of a practical maximum rate of extrusion of the plastic and a practical minimum rate of rotation of the knife, none of the strands of plastic extruded through said die plate exert pressure against the inner face of said knife blade but the ends of at least some of said strands contact the inner face of said knife blade adjacent to the opposite edge to the cutting edge as that portion of the blade passes thereover, means for driving the feed screw of said screw stuffer, and means for driving said rotatable knife controlled independently of the means for driving said feed screw.

3. An apparatus for forming uniformly sized pellets of an organic thermoplastic molding material, said apparatus comprising a screw stuffer, a perforated die plate at the extrusion end thereof, the extrusion end of the feed screw of said screw stuffer being spaced an appreciable distance from said die plate, an axial pressure distributor mounted on the internal face of said die plate, a rotatable knife mounted in axial alignment with the center of said die plate and adjacent the external face thereof, the inner face of each blade of said knife being a plane surface and disposed at an angle of two degrees to fifteen degrees to the external surface of said die plate, said angle being such that, under conditions of a practical maximum rate of extrusion of the plastic and a practical minimum rate of rotation of the knife, none of the strands of plastic extruded through said die plate exert pressure against the inner face of said knife blade but the ends of at least some of said strands contact the inner face of said knife blade adjacent to the edge opposite to the cutting edge thereof as that portion of the blade passes thereover, means for driving said feed screw, and means for driving said rotatable knife controlled independently of the means for driving said feed screw.

4. An apparatus for forming uniformly sized pellets, said apparatus comprising a screw stuffer, a perforated die plate at the extrusion end thereof, a rotatable knife mounted in axial alignment with the center of said die plate and adjacent the external face thereof, the inner face of each blade of said knife being a plane surface and disposed at an angle to the external face of said die plate such that, under conditions of a practical maximum rate of extrusion of the plastic and a practical minimum rate of rotation of the knife, none of the strands of plastic extruded through said die plate exert pressure against the inner face of said knife blade, means for driving the feed screw of said screw stuffer, and means for driving said rotatable knife controlled independently of the means for driving said feed screw.

FREDERICK J. FIELITZ.